United States Patent
Heywood et al.

(10) Patent No.: US 11,706,391 B1
(45) Date of Patent: Jul. 18, 2023

(54) FIRST RESPONDER MONITORING SYSTEM WITH DISTRESS DETECTION

(71) Applicant: Patent Pioneers, LLC, Boston, MA (US)

(72) Inventors: Kenneth J. Heywood, Hudson, WI (US); James M. Behmke, Pembroke, MA (US)

(*) Notice: Subject to any disclaimer, the term of this patent is extended or adjusted under 35 U.S.C. 154(b) by 148 days.

(21) Appl. No.: 17/369,478

(22) Filed: Jul. 7, 2021

Related U.S. Application Data

(60) Provisional application No. 63/050,293, filed on Jul. 10, 2020.

(51) Int. Cl.
| | |
|---|---|
| *H04N 7/18* | (2006.01) |
| *G08B 21/04* | (2006.01) |
| *H04W 4/029* | (2018.01) |
| *G10L 15/08* | (2006.01) |
| *H04W 4/90* | (2018.01) |

(52) U.S. Cl.
CPC ......... *H04N 7/188* (2013.01); *G08B 21/0469* (2013.01); *G10L 15/08* (2013.01); *H04N 7/185* (2013.01); *H04W 4/029* (2018.02); *H04W 4/90* (2018.02); *G10L 2015/088* (2013.01)

(58) Field of Classification Search
CPC ....... H04N 7/188; H04N 7/185; H04W 4/029; H04W 4/90; G08B 21/0469; G10L 15/08; G10L 2015/088
See application file for complete search history.

(56) References Cited

U.S. PATENT DOCUMENTS

| | | | |
|---|---|---|---|
| 10,242,544 B1* | 3/2019 | Walters | G08B 13/19613 |
| 10,257,434 B2 | 4/2019 | Arnold | |
| 10,504,618 B2 | 12/2019 | Lewis et al. | |
| 10,540,877 B1 | 1/2020 | Gersten | |
| 10,997,430 B1* | 5/2021 | Slavin | G08G 1/096791 |
| 2019/0174208 A1* | 6/2019 | Speicher | G06F 1/163 |
| 2019/0272725 A1* | 9/2019 | Viklund | G08B 21/0461 |
| 2020/0125838 A1* | 4/2020 | Dalley, Jr. | G06T 7/292 |
| 2020/0334967 A1* | 10/2020 | Sharma | G08B 21/0453 |
| 2020/0349829 A1* | 11/2020 | Larsen | H04N 7/188 |
| 2020/0409537 A1* | 12/2020 | Story | G06F 3/0482 |
| 2021/0201269 A1* | 7/2021 | Ainsworth | H04W 4/023 |
| 2021/0264764 A1* | 8/2021 | Glynn | G08B 21/0446 |

OTHER PUBLICATIONS

Toshev, et al., "DeepPose: Human Pose Estimation via Deep Neural Networks", onhline: https://arxiv.org/pdf/1312.4659.pdf, arXiv:1312.4659v3 [cs.CV] Aug. 20, 2014, 9 pages.
Lei, et al., "Low-Power Audio Keyword Spotting Using Tsetlin Machines", Journal of Low Power Electronics and Applications, 11, 18, Apr. 2021, 24 pages, MDPI.com.

(Continued)

*Primary Examiner* — Frantz B Jean
(74) *Attorney, Agent, or Firm* — Behmke Innovation Group LLC; Kenneth J. Heywood; James M. Behmke

(57) ABSTRACT

In one embodiment, a device obtains sensor data from one or more sensors worn by a first responder. The device analyzes the sensor data to identify a position of a person with whom the first responder is interacting. The device determines that a policy violation has occurred based in part on the position of the person. The device provides an alert that indicates the policy violation.

19 Claims, 9 Drawing Sheets

(56) References Cited

OTHER PUBLICATIONS

Friese, Greg, "How to Use OPQRST as an Effective Patient Assessment Tool", online: https://www.ems1.com/ems-products/education/articles/how-to-use-opqrst-as-an-effective-patient-assessment-tool-yd2KWgJIBdtd7D5T/, Jan. 20, 2020, 4 pages.

Zhu, et al., "In vitro study of foot bone kinematics via a custom-made cadaveric gait simulator", Journal of Orthopaedic Surgery and Research (2020) 15:346, 7 pages, Open Access.

Shah, et al., "A Fixed-Point Neural Network for Keyword Detection on Resource Constrained Hard", online: http://blaauw.engin.umich.edu/wp-content/uploads/sites/342/2017/11/592.pdf, 2017, 6 pages.

Gupta, et al., "Feature Extraction Using MFCC", Signal & Image Processing : An International Journal (SIPIJ) vol. 4, No. 4, Aug. 2013, pp. 101-108.

Lin, et al., "A Study of Color Illumination Effect on the SNR of rPPG Signals", 2017 39th Annual International Conference of the IEEE Engineering in Medicine and Biology Society (EMBC), Jul. 2017, pp. 4301-4304, IEEE.

Chen, et al., "SHPD: Surveillance Human Pose Dataset and Performance Evaluation for Coarse-Grained Pose Estimation", 2018 25th IEEE International Conference on Image Processing (ICIP), Oct. 2018, pp. 4088-4092, IEEE.

Munea, et al. "The Progress of Human Pose Estimation: A Survey and Taxonomy of Models Applied in 2D Human Pose Estimation", IEEE Access, vol. 8, Jul. 2020, pp. 133330-133348, IEEE.

"EMTprep Free Training Materials",online: https://emtprep.com/free-training/post/all-those-ems-acronyms-when-to-use-them, Jun. 2020, 4 pages.

"Convolutional Neural Network", online: https://en.wikipedia.org/wiki/Convolutional_neural_network, Jul. 2, 2021, 22 pages, Wikimedia Foundation, Inc.

\* cited by examiner

FIRST RESPONDER MONITORING SYSTEM WITH DISTRESS DETECTION

RELATED APPLICATION

This application claims priority to U.S. Provisional Patent Application No. 63/050,293, filed on Jul. 10, 2020, entitled "FIRST RESPONDER MONITORING SYSTEM WITH DISTRESS DETECTION" by Heywood et al., the contents of which are incorporated by reference herein.

TECHNICAL FIELD

The present disclosure relates generally to computerized systems and, more particularly, to a first responder monitoring system with distress detection.

BACKGROUND

In recent years, there has been increased scrutiny of first responders, such as police, firefighting, and emergency medical personnel. In these professions, life and death decisions are often made in very short periods of time. Stressful situations such as these can often lead to tunnel vision, auditory exclusion (e.g., sounds not registering with the first responder), and other neurological conditions whereby the senses of the first responder are dulled. Because of this, a first responder may miss signs of medical distress exhibited by a person with whom the first responder is interacting.

Body cameras and wearable devices are being used increasingly to help document the interactions between first responders and the public. This helps to protect the first responders and their departments from liability, as well as to ensure accountability in cases of bad actors. Unfortunately, the review of body cameras has traditionally been after an event occurs. Even in cases of wearable devices that support livestreaming, identification of an individual in medical distress requires the attention of a remote reviewer that has been medically trained to identify when individuals are in distress.

SUMMARY

According to the techniques described herein, systems and methods are disclosed in which sensor data, such as video, audio, and the like are automatically captured by a wearable device and analyzed to identify individuals in medical distress. In some embodiments, machine learning is applied to the sensor data, either locally or remotely, to detect such conditions and generate alerts. For instance, one alert may notify the first responder of the detected condition (e.g., to change the behavior of the first responder), while another alert (e.g., additionally and/or based on different thresholds) may dispatch emergency medical personnel, in the case of an individual exhibiting medical distress. In further embodiments, hazardous conditions, policy violations, and the like, can also be detected, through the application of machine learning to the captured sensor data.

In some embodiments, a device obtains sensor data from one or more sensors worn by a first responder. The device analyzes the sensor data to identify a position of a person with whom the first responder is interacting. The device determines that a policy violation has occurred based in part on the position of the person. The device provides an alert that indicates the policy violation.

In one embodiment, the position of the person corresponds to a hold or restraint applied by the first responder to the person. In another embodiment, the device determines that the position of the person constitutes a policy violation by determining that the hold or restraint has been applied by the first responder for more than a threshold amount of time. In a further embodiment, the alert is an audible alert for the first responder. In another embodiment, the device provides the alert to a device of a supervisor of the first responder.

In an additional embodiment, the device also makes, based on the sensor data, a determination that the person with whom the first responder is interacting is in medical distress, whereby the device determines that the position of the person constitutes a policy violation in part on the determination that the person is in medical distress. In a further embodiment, the sensor data is indicative of at least one of: a respiratory rate of the person or a pulse rate of the person. In another embodiment, the determination that the person is in medical distress indicates that the person is unconscious.

In another embodiment, the device determines that the position of the person constitutes a policy violation by detecting an utterance by a bystander in audio data of the sensor data. In a further embodiment, the device analyzes the sensor data to identify a position of the person by applying a machine learning-based classifier to image or video data in the sensor data. In yet another embodiment, the alert causes an additional first responder to be dispatched to a location of the first responder. In another embodiment, the device obtains the sensor data from a vehicle of the first responder. In another embodiment, the device is worn by the first responder. In a further embodiment, the position of the person indicates that the person has been struck by the first responder.

In another embodiment, the device may also detect a keyword uttered by the first responder, whereby the device determines that a policy violation has occurred based further in part on the keyword uttered by the first responder. In some embodiments, the keyword may comprise an unsafe or illegal command for the person. In another embodiment, the device may detect a keyword uttered by the person, whereby the device determines that a policy violation has occurred based further in part on the keyword uttered by the person.

In yet another embodiment, the device may also generate a report that summarizes an interaction between the first responder and the person.

In further embodiments, an apparatus is disclosed that includes one or more network interfaces, a processor coupled to the one or more network interfaces and configured to execute one or more processes, and a memory configured to store a process that is executable by the processor. When executed, the process is configured to obtain sensor data from one or more sensors worn by a first responder, analyze the sensor data to identify a position of a person with whom the first responder is interacting, determine that a policy violation has occurred based in part on the position of the person, and provide an alert that indicates the policy violation.

In additional embodiments, a tangible, non-transitory, computer-readable medium is disclosed that stores program instructions that cause a device to execute a process. The process includes obtaining, by the device, sensor data from one or more sensors worn by a first responder, analyzing the sensor data to identify a position of a person with whom the first responder is interacting, determining that a policy violation has occurred based in part on the position of the person, and providing an alert that indicates the policy violation.

Other specifics and embodiments are further described herein, including various conditions, alerts, responses, reporting, and so on, and this summary is not meant to be limiting to scope of the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
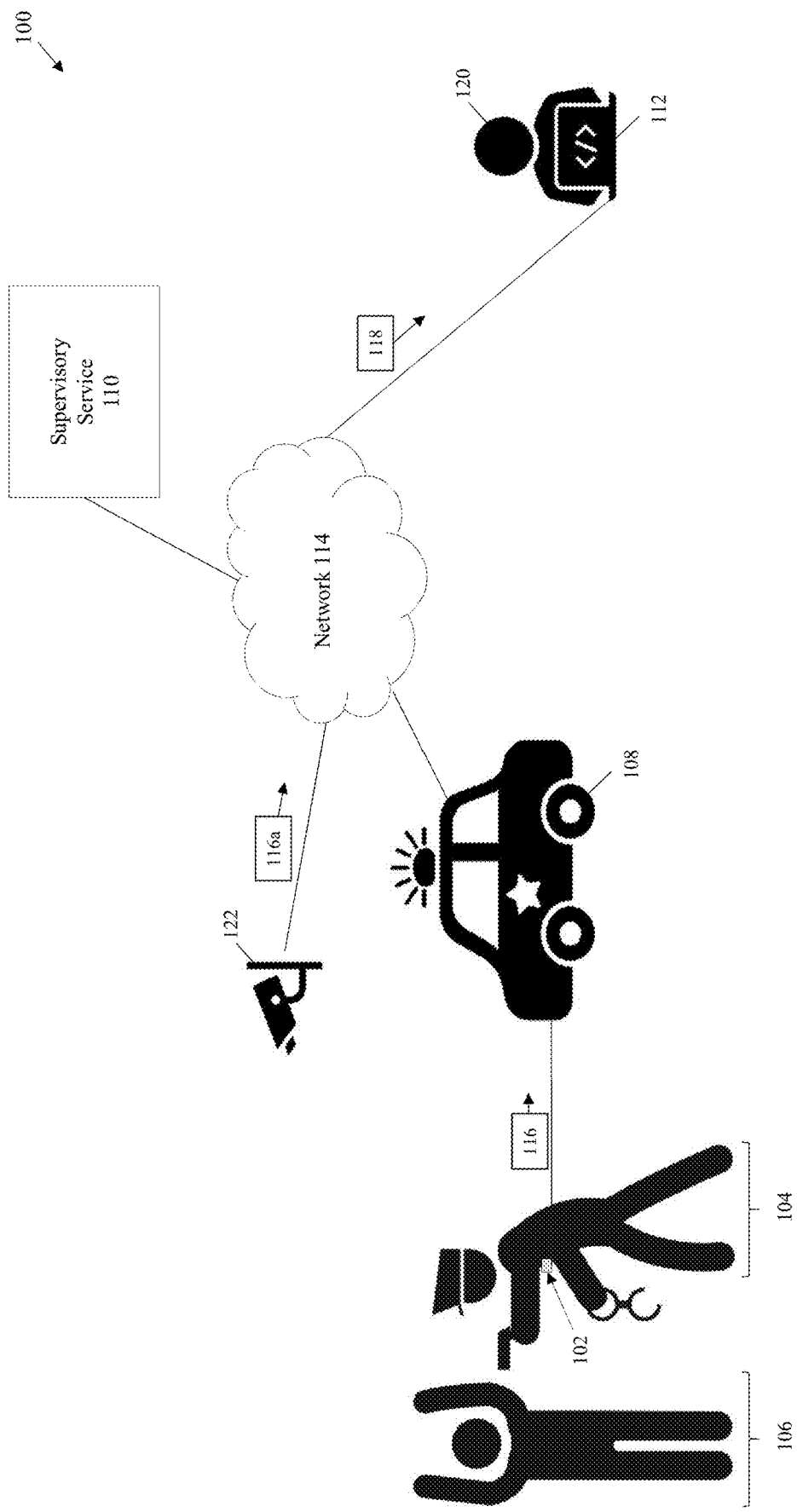
FIG. 1 illustrates an example first responder monitoring system, in accordance with various embodiments herein.

FIG. 1 illustrates an example first responder monitoring system 100, according to various embodiments. As shown, first responder monitoring system 100 may include any or all of the following components: a wearable device 102, a vehicle 108, a supervisory service 110, a monitoring device 112, and/or external sensor(s) 122.

During operation, wearable device 102, vehicle 108, supervisory service 110, and monitoring device 112 may be communicatively coupled with one another, either directly or indirectly, such as by leveraging a communication infrastructure that forms a communication network 114. For instance, wearable device 102, vehicle 108, and/or monitoring device 112 may communicate with supervisory service 110 via the Internet or other network 114. Accordingly, network 114 may comprise any number of wide area networks (WANs), local area networks (LANs), personal area networks (PANs), and/or direct network connections between any of these components.

As would be appreciated, example network connections and infrastructure used by wearable device 102, vehicle 108, supervisory service 110, and monitoring device 112 may include, but are not limited to, wireless approaches such as Wi-Fi, cellular, satellite, and the like, and/or wired approaches such as Ethernet, cable Internet, fiber optics, and the like. In further embodiments, one component of system 100 may operate as an access point for another component of system 100, to allow that component to access network 114. To this end, the two components may communicate with one another using a shorter-range communication approach, such as via Bluetooth, Z-Wave, ZigBee, 6LoW-PAN, or the like. For instance, in one embodiment, wearable device 102 may communicate directly with vehicle 108, which relays communications between wearable device 102 and network 114. In other embodiments, wearable device 102 may include its own network interfaces, such as a cellular or satellite transceiver, to communicate directly with network 114.

Wearable device 102 may comprise a body camera or other device configured to be worn by a first responder 104. In further embodiments, wearable device 102 may comprise a plurality of devices that operate in conjunction with one another to perform the functions described herein. In general, wearable device 102 is configured to generate and transmit sensor data 116 to supervisory service 110. In various embodiments, sensor data 116 may comprise any or all of the of following:

Video data—In various embodiments, video data may comprise data captured by one or more cameras of wearable device 102 in the visible and/or non-visible spectrums. For instance, in some embodiments, the captured video data may comprise data captured in the infrared spectrum, such as via infrared thermography (IRT), data captured in the ultraviolet spectrum, and/or data in the visible spectrum.

Audio data—In various embodiments, one or more microphones of wearable device 102 may capture audio data from the nearby area surrounding wearable device 102.

Motion data—In various embodiments, one or more accelerometers of wearable device 102 may capture motion data regarding the motions of first responder 104, such as during a chase of a person 106.

Health data—In various embodiments, wearable device 102 may also capture health data regarding first responder 104, such as a measured pulse rate, temperature, pulse oximetry, respiratory rate, or the like.

Location data—In some instances, wearable device 102 may also generate and send data indicative of its location as part of sensor data 116. For instance, wearable device 102 may send cellular signals that can be used to triangulate its location, global positioning system (GPS) coordinates, or the like. In another embodiment, the location information may be sent by vehicle 108 to supervisory service 110, which can be correlated with the other sensor data 116 generated by wearable device 102.

In some embodiments, system 100 may further include any number of external sensor(s) 122, such as cameras, wearable devices worn by one or more other first responders, mobile devices operated by any bystanders, or the like, that are also connected to network 114. During operation, external sensor(s) 122 may capture and transmit sensor data 116*a* that comprises any or all of the above information described with respect to sensor data 116. For instance, sensor data 116*a* may comprise captured video data depicting first responder 104 and person 106, but from a different angle than that captured by wearable device 102.

While it is contemplated that sensor data 116*a* may serve as supplemental data that can be analyzed in conjunction with sensor data 116 using the techniques herein, further embodiments provide for sensor data 116*a* to be analyzed separately from, or in lieu of, sensor data 116. To this end, references to the processing of sensor data 116 herein may be viewed as also applying to sensor data 116*a*.

Supervisory service 110 may comprise any number of specifically configured computing devices/apparatuses that facilities communications between wearable device 102, vehicle 108 and monitoring device 112. In various embodiments, supervisory service 110 may provide a cloud-hosted service or datacenter-hosted service that oversees the operation of wearable device 102, vehicle 108, external sensor(s) 122, and/or monitoring device 112. In some embodiments, supervisory service 110 may receive sensor data 116 generated by wearable device 102, perform analysis on the received sensor data 116, and provide data 118 to monitoring device 112 for review. For instance, data 118 may comprise the raw sensor data 116 captured by wearable device 102 and/or any inferences or alerts generated respect to sensor data 116.

In various embodiments, the processing and analysis of sensor data 116 may be performed in whole, or in part, by supervisory service 110, vehicle 108, monitoring device 112, external sensor(s) 122, and/or wearable device 102. For instance, vehicle 108 may be equipped with computing components configured to perform preliminary analysis of sensor data 116, while supervisory service 110 performs a deeper analysis of sensor data 116 under certain conditions (e.g., in response to vehicle 108 determining that further analysis is required).

As described in greater detail below, sensor data 116 may be analyzed to identify any or all of the following conditions:

Medical conditions of person 106—In various embodiments, sensor data 116 may be analyzed to identify medical conditions of person 106 that are signs of medical distress such as, but not limited to, respiratory distress, seizures, hypoglycemia, psychological conditions (e.g., schizophrenia, panic attack, etc.), unconsciousness, or the like. In some embodiments, the analysis of sensor data 116 may further be used to predict the future presence of medical distress by person 106, based on the current situation.

Policy compliance by first responder 104—In further embodiments, sensor data 116 may be analyzed to identify situations in which first responder 104 has violated a department policy. Such policy violations may include, but are not limited to, an excessive use of force on person 106, an improper use of joint locks or chokeholds on person 106, the use of discriminatory or profane language by first responder 104, illegal acts, or the like.

In various embodiments, the above analysis of sensor data 116 can be used in system 100 for various functions such as, but not limited to, any or all of the following:

Alerting user 120 of monitoring device 112 to the current situation of first responder 104. More specifically, user 120 may be responsible for monitoring a plurality of wearable devices, such as wearable device 102, thereby dividing the attention of user 120 at any given time. By alerting user 120 via data 118 as to the current situation involving first responder 104, user 120 can initiate actions such as deploying backup to first responder 104, dispatching emergency medical or fire personnel, interacting with first responder 104 (e.g., by sending voice commands to first responder 104 via wearable device 102), or the like.

Initiating automatic actions, based on the analysis of sensor data 116, such as deploying backup to first responder 104, dispatching emergency medical or fire personnel, or the like. In some embodiments, automatic actions may be initiated by system 100, thereby bypassing the need for user 120 to first review data 118. For instance, if sensor data 116 determines that person 106 (or even first responder 104) is unresponsive, system 100 may automatically dispatch emergency medical personnel to the location. In some embodiments, any automatic actions taken by system 100 may be indicated in data 118 sent to monitoring device 112, so as to allow user 120 to review the actions and the current situation.

Figure 2:
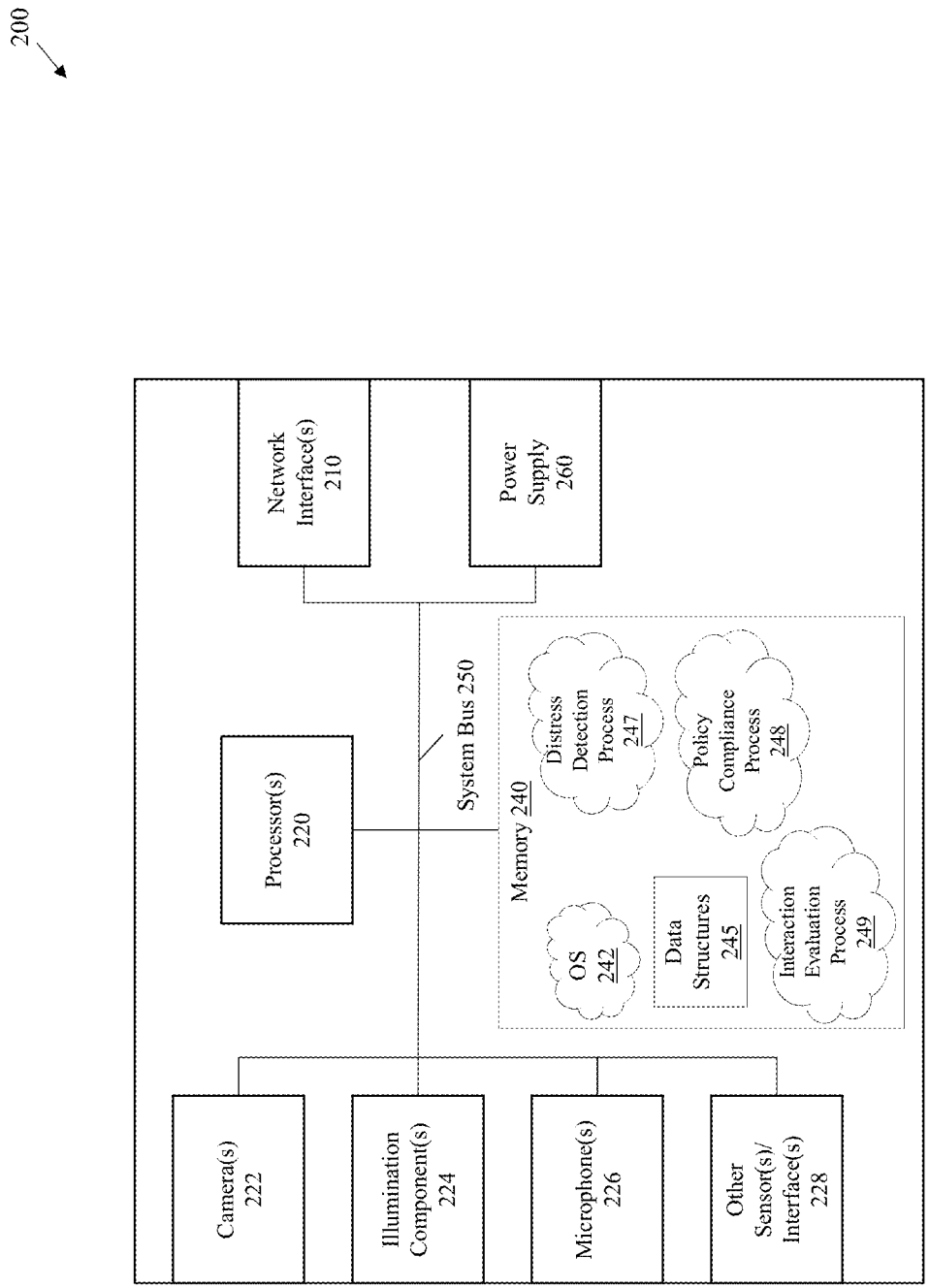
FIG. 2 illustrates an example device, in accordance with various embodiments herein.

FIG. 2 is a schematic block diagram of an example device 200 (e.g., an apparatus) that may be used with one or more embodiments described herein, e.g., any of the devices shown in FIG. 1 (e.g., wearable device 102, vehicle 108, supervisory service 110, or monitoring device 112). As shown, device 200 may comprise one or more network interfaces 210 (e.g., wired, wireless, etc.), at least one processor 220, and a memory 240 interconnected by a system bus 250, as well as a power supply 260 that provides electrical power to device 200.

The network interface(s) 210 contain the mechanical, electrical, and signaling circuitry for communicating data with other computing devices in system 100. The network interfaces may be configured to transmit and/or receive data using a variety of different communication protocols. Note, further, that device 200 may have two different types of network connections, e.g., wireless and wired/physical connections, and that the view herein is merely for illustration.

In various embodiments, device 200 may also include any number of cameras 222, illumination components 224, microphone(s) 226, and/or other sensors/interfaces 228. For instance, in the case in which device 200 comprises a wearable device, device 200 may include any or all of these components, to capture sensor data, such as video and/or audio data. In some cases, device 200 may also include illumination components 224 that may provide visible and/or non-visible (e.g., infrared, ultraviolet, etc.) illumination of a person or object being filmed by camera(s) 222.

Other sensors/interfaces 228 may include various other sensors or interfaces that allow device 200 to capture sensor data and/or convey sensory information to the user of device 200. For instance, other sensors/interfaces 228 may include a GPS sensor to capture location information, an accelerometer to capture motion, a temperature sensor to capture temperature measurements (e.g., body temperature measurements, etc.), pulse rate sensors, blood pressure sensors, or the like. In further instances, other sensors/interfaces 228 may include one or more speakers, electronic displays, vibration/pulsation mechanisms, or the like, to convey information to the user of device 200.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a distress detection process 247, policy compliance process 248, and/or an interaction evaluation process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, where certain processes have been shown separately, those skilled in the art will appreciate that processes may be routines or modules within other processes.

Distress detection process 247, policy compliance process 248, and/or interaction evaluation process 249 include computer executable instructions that, when executed by processor 220, cause device 200 to perform the various image analysis functions described herein. More specifically, distress detection process 247 may be configured to assess sensor data captured either locally by camera(s) 222, microphone(s) 226, and/or other sensor(s)/interface(s) 228, or by another device in communication with device 200 via network interface(s) 210.

In various embodiments, distress detection process 247, policy compliance process 248, and/or interaction evaluation process 249 may use machine learning to perform the analysis of captured sensor data. Generally, machine learning refers to any form of programmatic technique that can adapt to new forms of input data and produce a corresponding output. For example, in the context of analyzing captured images in a video feed, a machine learning-based process may be able to identify specific conditions, such as a person in medical distress, even though the process was not explicitly programmed to analyze that specific image.

A machine learning-based process may employ one or more supervised, unsupervised, or semi-supervised machine learning models to analyze the captured images of the subject. Generally, supervised learning entails the use of a training dataset, which is used to train the model to apply labels to the input data. For example, the training data may include sample images that have labeled image features, such as certain postures or positions of a person, etc. On the other end of the spectrum are unsupervised techniques that do not require a training set of labels. Semi-supervised learning approaches take a middle ground approach that uses a greatly reduced set of labeled training data.

Preferably, the machine learning model(s) of detection process 247, policy compliance process 248, and/or interaction evaluation process 249 may include one or more deep-learning classifiers. Such a classifier may, for example, attempt to classify/label a given image or portion of an image based on a training set of labeled image data. Generally, deep-learning refers to a branch of machine learning that attempts to identify and leverage otherwise unseen patterns in the input data that may exist at one or more layers of abstraction from the input data.

In some embodiments, a given classifier of detection process 247, policy compliance process 248, and/or interaction evaluation process 249 may comprise one or more trained artificial neural network (ANN), to classify the input image data. For example, a classifier of detection process 247, policy compliance process 248, and/or interaction evaluation process 249 may be based on a convolution neural network (CNN) that uses a feed-forward approach. In another example, the classifier may use one or more multi-layer perceptron (MLP) models. As would be appreciated, MLP models use a more general architecture than that of CNNs whereby CNNs utilize convolution elements, i.e., the same weights used repetitively at different locations in an image or current layer representation.

Further examples of machine learning techniques that detection process 247, policy compliance process 248, and/or interaction evaluation process 249 may use include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), support vector machines (SVMs), logistic or other regression, Markov models or chains, principal component analysis (PCA) (e.g., for linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, in the case of identifying or predicting a person in medical distress, the false positives of the model may refer to the number of times the model incorrectly identified or predicted that the person is, or will be, in distress. Conversely, the false negatives of the model may refer to the number of times the model incorrectly determined that the person was not in distress, or predicted that they will not be in distress. True negatives and positives may refer to the number of times the model correctly labeled the sensor data. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. A further performance measure for a machine learning-based classifier can also include the relative distribution of classes, such as log-loss (binary or multi-class).

Figure 3:
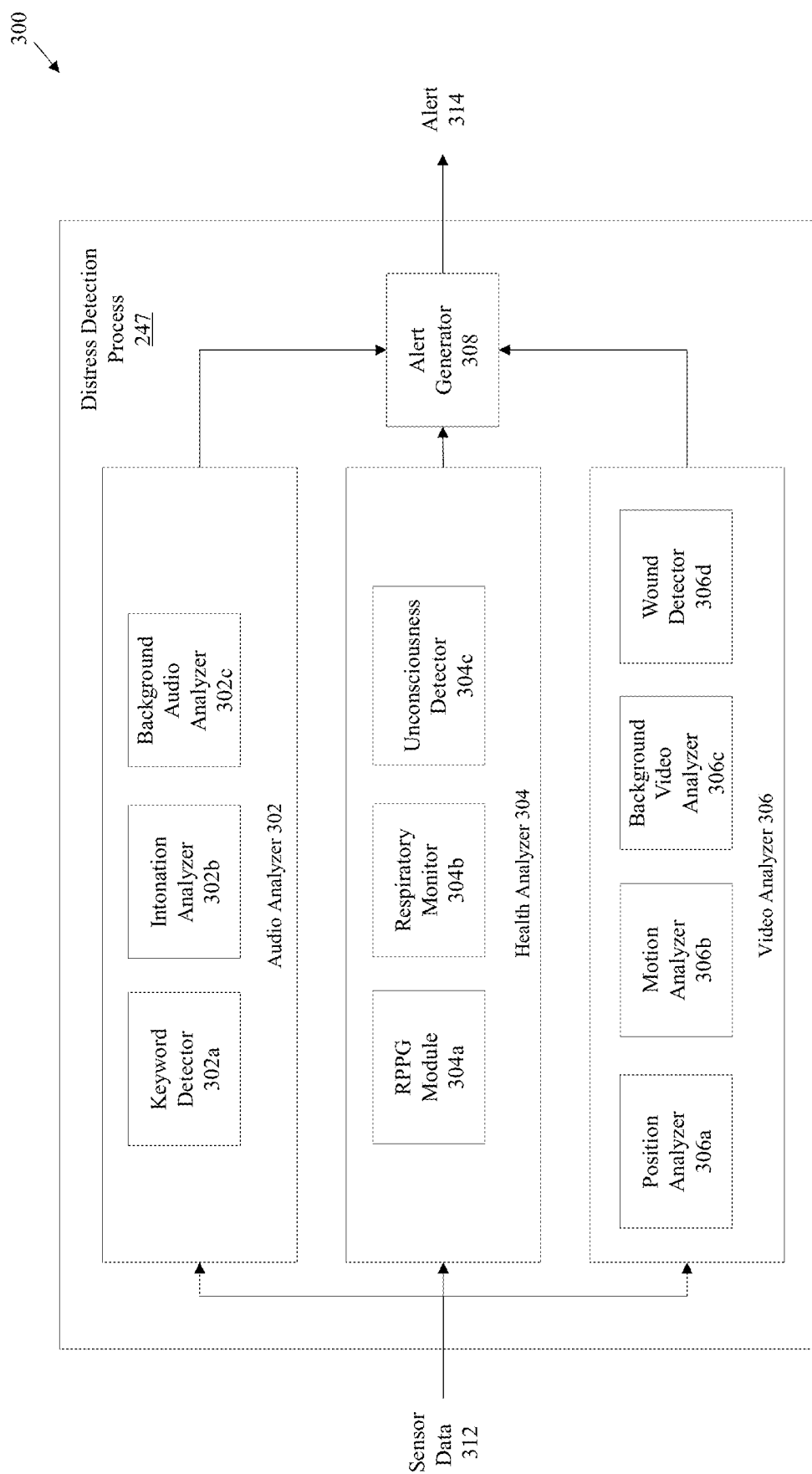
FIG. 3 illustrates an example architecture for a distress detection process, in accordance with various embodiments herein.

FIG. 3 illustrates an example architecture 300 for distress detection process 247, according to various embodiments. As shown, distress detection process 247 may include any number of analyzers, such as an audio analyzer 302, a health analyzer 304, and/or a video analyzer 306, that are configured to analyze sensor data 312 captured by a wearable device of a first responder (e.g., wearable device 102 in FIG. 1) and/or other sensors in the area, such as sensor(s) 122 shown in FIG. 1 (e.g., video cameras, doorbell cameras, other first responders with wearable devices, and so on). As would be appreciated, these sub-processes/components may be located on the same device or implemented in a distributed manner across multiple devices, the combination of which may be viewed as a single system/device that executes distress detection process 247. Further, while certain functionalities are described with respect to the sub-processes and memory locations, these functions can be added, removed, or combined as desired, in further implementations. Moreover, the functionalities described herein may be located locally (e.g., on the wearable device and/or the vehicle) or remotely (e.g., supervisory service), or in any combination thereof (e.g., local assessment and remote confirmation, local pre-processing and remote final-processing, and so on).

As shown, audio analyzer 302 may comprise various sub-components, such as a keyword detector 302a, an intonation analyzer 302b, and/or a background voice analyzer 302c, according to various embodiments. During execution, keyword detector 302a may analyze audio data in sensor data 312 for the detection of specific keywords that may be indicative of a person being in medical distress. In some embodiments, keyword detector 302a may also employ voice recognition, to distinguish between utterances by the first responder, the person with whom the first responder is interacting, and/or other people or objects. For instance, such keywords (denoted in brackets below), or phrasal variations thereof, may include any or all of the following:
"I can't [breathe]."
"I'm [choking]."
"I feel [dizzy]."
"You're [hurting] me."
"I'm going to [pass out]."
"I need my [medication]."
"Call for an [ambulance]."
"He's losing [consciousness]."
"He [shot] me."
"He [stabbed] me."
"Someone [help] me!"
Etc.

More specifically, keyword detector 302a may apply a voice recognition model to any audio captured in sensor data 312, to identify any of the above keywords or phrasal variations that include such keywords. As would be appreciated, while the above keywords and phrases are provided in English, keyword detector 302a may include models to detect similar keywords in phrases across any number of different languages (e.g., Spanish, Chinese, Arabic, etc.).

In some embodiments, keyword detector 302a may operate by converting the audio data into an image representation, such as a heatmap. By doing so, keyword detector 302a can use an image recognition classifier on the representation (e.g., a CNN or the like). Such an image may, for instance, be generated by plotting the frequency (e.g., in Hz) against the log-amplitude generated by a mel-frequency cepstrum coefficient (MFCC). In turn, keyword detector 302a may apply a CNN or other suitable classifier to the resulting image, to detect the utterance of specific keywords on which the classifier has been trained.

Intonation analyzer 302b may be configured to assess the intonations and other features of any captured voice or other audio in sensor data 312, according to various embodiments. For instance, intonation analyzer 302b may identify sobbing, crying, screaming, shouting, choking noises, whispering, or the like. Such information can help to add context to the analyses by keyword detector 302a and background voice analyzer 302c. Notably, not every utterance of a keyword may be cause for an alert to be generated by distress detection process 247. For instance, a simple utterance of "can you [help] me change a tire?" may be quite innocuous, as opposed to an utterance of "Help! My leg is stuck." Classification by intonation analyzer 302b may be achieved, for instance, by labeling the audio from sensor data 312 as being "rising," "falling," "high," or "low."

Background audio analyzer 302c may be configured to assess any background noises or utterances surrounding the first responder, according to various embodiments. In general, background audio analyzer 302c may extract, amplify, and/or classify any audio signals that are present in sensor data 312, but are not the primary signals (e.g., those signals existing at lower amplitudes). Such processing may be achieved, in some embodiments, in a manner similar to that of keyword detector 302a and/or intonation analyzer 302b, with the emphasis on what can be heard beyond the interaction between the first responder and a person with whom the first responder is interacting.

By way of example, background audio analyzer 302c may assess the audio of sensor data 312 to identify voice or other sounds that may be indicative of medical distress exhibited by the person interacting with the first responder. For instance, background audio analyzer 302c may detect the utterances of keywords or phrases such as the following:
"You're [hurting] him!"
"This is [police brutality] !"
"You're [killing] her!"
"He [can't breathe] !"
etc.

In various embodiments, health analyzer 304 may be configured to assess the health of the person with whom the first responder is interacting. Such information can be used, for instance, to detect instances of medical distress, even when audio analyzer 302 does not detect any signs of distress. To this end, health analyzer 304 may include any or all of the following: a remote photoplethysmography (RPPG) module 304a, a respiratory monitor 304b, and/or an unconsciousness detector 304c.

During execution, RPPG module 304a may assess image/video data captured in sensor data 312, to determine a heart/pulse rate of the person with whom the first responder is interacting, in one embodiment. In general, RPPG functions by illuminating a person and assessing both the specular and diffuse reflections of that light off the skin of the person. More specifically, the diffuse reflection is a function of blood volume under the skin. Thus, changes in the blood volume due to the heart/pulse rate of the person result in changes in the diffuse reflection. By extracting the color variations over time and filtering for noise, RPPG module 304a can then detect the peaks of the resulting signals, which correspond to heartbeats.

In various embodiments, respiratory monitor 304b may be configured to assess audio, video, and/or other sensor information in sensor data 312, to estimate the breathing rate of the person with whom the first responder is interacting. In one embodiment, respiratory monitor 304b may apply an image classifier to video data in sensor data 312, to detect inhalation and exhalation by the person. In a further embodiment, respiratory monitor 304b may assess audio data in sensor data 312, to detect breaths taken by the person. In a more complex embodiment, respiratory monitor 304b may correlate both the audio data and video data in sensor data 312, to ensure that the captured audio matches that of the identified breathing from the video data in sensor data 312.

In some embodiments, health analyzer 304 may also include an unconsciousness detector 304c that is configured to identify when the person with whom the first responder is interacting is unconscious. To do so, unconsciousness detector 304c may apply any number of image classifiers to video data in sensor data 312, to apply classification labels to the images, such as "unresponsive," "seizing," "fainting," "normal," or the like. In another embodiment, unconsciousness detector 304c may also take as input other sensor data 312, such as audio data, temperature measurements, or the like, to enhance the accuracy of its classifications. For instance, a sudden stop or change in the utterances by the person interacting with the first responder, coupled with an image of the person falling to the ground, may be a strong indication that the person has become unconscious or worse.

In various embodiments, video analyzer 306 may include any or all of the following components: a position analyzer 306a, a motion analyzer 306b, a background video analyzer 306c, and/or a wound detector 306d. During execution, video analyzer 306 may be configured to identify instances of medical distress exhibited by the person with whom the first responder is interacting.

In general, position analyzer 306a is configured to apply image classification to video data in sensor data 312, so as to label the position of the person with whom the first responder is interacting. For instance, position analyzer 306a may detect and apply labels such as "laying prone," "holding neck," "joint lock," "headlock," "chokehold," "normal," and the like. Such information can be quite useful to provide context to the other components of distress detection process 247. Notably, if the person is being held in a headlock, their respiratory rate begins to drop, and they are at or near unconsciousness, this may be a strong indication that distress detection process 247 should generate and send an alert 314.

According to various embodiments, position analyzer 306a may be implemented using one or more deep neural network (DNN)-based models that are trained to identify the relative positions of a human, such as the articulation of their limbs, the relative locations of their head, torso, and limbs, etc. For instance, testing has shown that this can be achieved using an initial stage comprising a DNN-based regressor having a number of initial convolutional layers, a local response normalization layer, a pooling layer, and a fully connected layer, with only the convolutional and fully connected layers having learnable parameters. Processing can be performed in stages, to refine the values, such as by analyzing sub-portions of the image.

Figure 6:
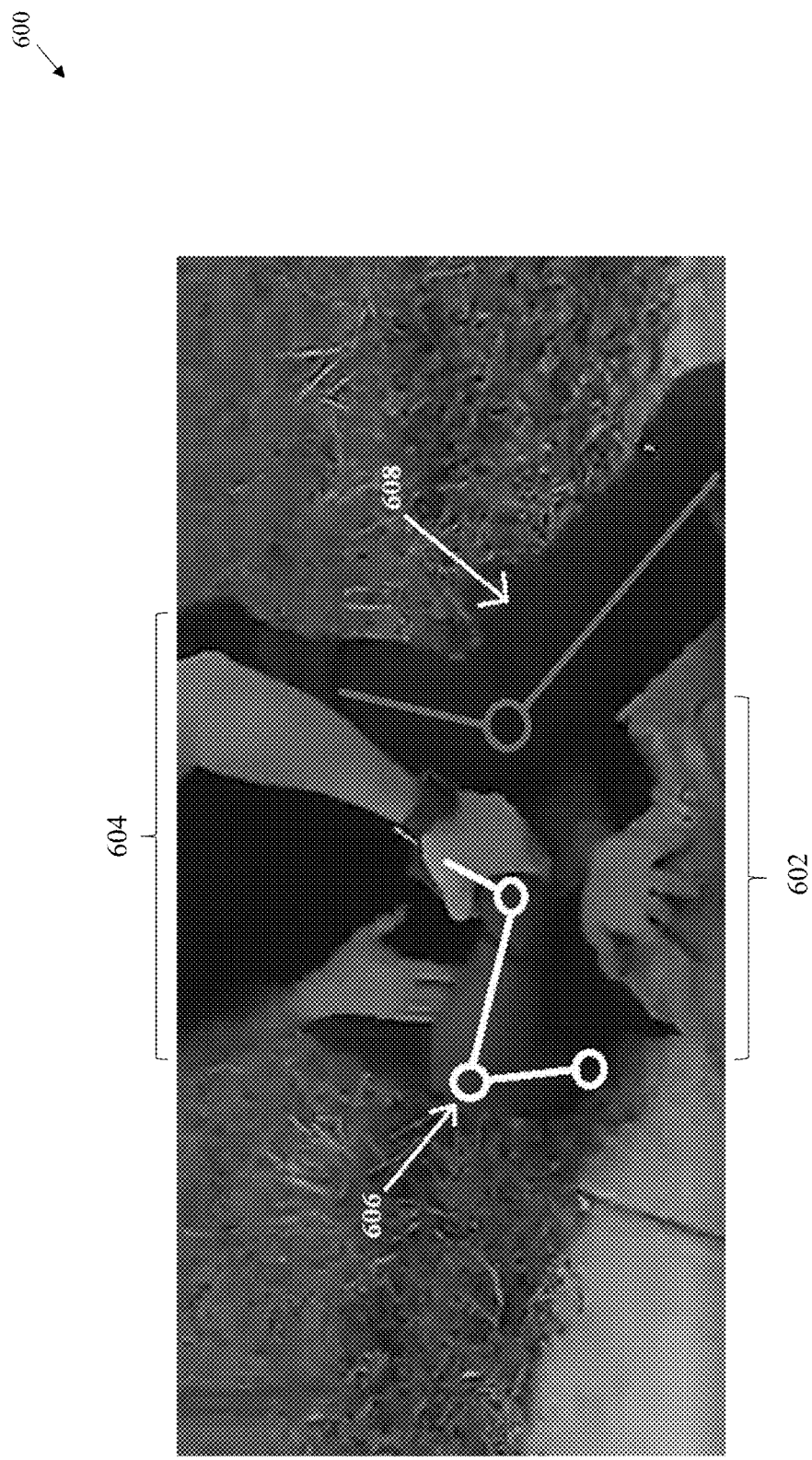
FIG. 6 illustrates an example of position analysis, in accordance with various embodiments herein.

FIG. 6 illustrates an example of position analysis by position analyzer 306a, in accordance with various embodiments herein. As shown, image 600 depicts a person 602 being restrained by a first responder 604. For instance, image 600 may be captured by a wearable device worn by another first responder on scene, a dashcam on board the vehicle of first responder 604, or the like.

In various embodiments, position analyzer 306a may analyze image 600 to distinguish between person 602 and first responder 604, as well as to identify their relative body poses. For instance, position analyzer 306a may identify arm 606 of person 602 as being in a joint lock, based on its positioning, with pressure being applied to both the wrist of person 602 as well as to their elbow. In addition, position analyzer 306a may also identify leg 608 as being in a kneeling position on top of person 602, which may also be a pose that position analyzer 306a has been trained to identify.

Referring again to FIG. 3, motion analyzer 306b may be configured to evaluate the motion of the person with whom the first responder is interacting, to identify any motion that could be indicative of medical distress, in various embodiments. For instance, motion analyzer 306b may classify video in sensor data 312 using labels such as "falling," "seizing," "normal," or the like. In one embodiment, motion analyzer 306b may do so by analyzing the captured images, directly. In other embodiments, motion analyzer 306b may first convert the person depicted in the video into a wireframe or other representation and then applying a classifier to that representation. Doing so may provide for better classification than strict image classification, as a large training dataset across different body types and sizes might otherwise be needed.

In a further embodiment, motion analyzer 306b may be configured to assess the pupil dilation of the person with whom the first responder is interacting. A corresponding classifier of motion analyzer 306b may, for instance, identify conditions whereby pupil dilation of the person could indicate the use of narcotics, seizure conditions, or the like.

Background video analyzer 306c may be configured to assess the background video surrounding the first responder and the person with whom the first responder is interacting, in various embodiments. In general, instances of medical distress are often accompanied by crowds of people at the scene and other external indicators. To this end, background video analyzer 306c may classify the video data in sensor data 312, to detect the presence of a crowd, a movement of other people towards or away from the scene, etc.

In various embodiments, video analyzer 306 may also include a wound detector 306d that comprises one or more classifiers trained to detect the presence of wounds in the video of sensor data 312. To do so, one or more CNN-based classifiers, or other classifiers, may be trained using training datasets depicting various wounds and other indicia, such as blood, scrapes, cuts, bruises, bone fractures, and the like, that have been labeled as such. In addition, the training dataset of wound detector 306d may be trained using negative examples, such as depictions of people that do not exhibit any wounds. In doing so, wound detector 306d may label sensor data 312 with labels such as "blood," "bruise," "normal," etc.

While analyzers 302-306 are shown as separate data pipelines for purpose of describing the techniques herein, further embodiments provide for them to leverage the inputs and/or outputs of one another. For instance, in one embodiment, unconsciousness detector 304c may take as input sensor data 312 and/or the outputs of position analyzer 306a, motion analyzer 306b, intonation analyzer 302b, etc., to determine whether the person is unconscious.

In various embodiments, alert generator 308 may take as input the outputs of audio analyzer 302, health analyzer 304, and video analyzer 306, to determine whether an alert 314 should be issued. In some embodiments, such outputs may take the form of classification labels and associated probability/confidence measures, estimated values (e.g., pulse rate, respiratory rate, etc.), or the like. In turn, alert generator 308 may apply its own machine learning models to these outputs, to determine whether to send an alert 314.

Said differently, distress detection process 247 may take the form of an ensemble of classifiers and/or other machine learning models, to determine whether an alert 314 should be issued. For instance, alert generator 308 may take the form of a decision tree (e.g., a random forest) that evaluates the various outputs of audio analyzer 302, health analyzer 304, and video analyzer 306. This approach may also take into account various weightings for these outputs, in some embodiments. For instance, individual outputs may be weighted by their severity, such as by applying different weightings to different keywords detected by keyword detector 302a, applying a greater weighting to unconsciousness determinations by unconsciousness detector 304c, or the like. In further embodiments, alert generator 308 may apply weightings to the outputs of audio analyzer 302, health analyzer 304, and video analyzer 306 based in part on their probabilities/confidence scores. For instance, a classification label from position analyzer 306a of "unresponsive" with a confidence score of 0.25 may receive a lower rating than the same classification label with a confidence score of 0.97.

In some embodiments, alert generator 308 may also include one or more unsupervised or semi-supervised anomaly detection models, to assess individual outputs of audio analyzer 302, health analyzer 304, and video analyzer 306. For instance, if RPPG determines that the heart rate of the person is anomalous (e.g., outside of an acceptable range, erratic, etc.), alert generator 308 may either issue an alert 314 based on this alone, or apply a weighting based in part on this determination, so as to all but guarantee that an alert 314 will be sent. In further embodiments, alert generator 308 may apply any number of thresholds or heuristics to the outputs of audio analyzer 302, health analyzer 304, and video analyzer 306, to achieve similar anomaly detection, such as when acceptable ranges are known.

In further embodiments, alert generator 308 may include one or more prediction models configured to predict future cases of medical distress. In one embodiment, such a predictive model may asses time series of outputs from audio analyzer 302, health analyzer 304, and/or video analyzer 306, to detect instances in which the person interacting with the first responder is likely to exhibit medical distress in the near future. For instance, if the heart rate determined by RPPG module 304a or respiratory rate determined by respiratory monitor 304b is trending downward, the prediction model may predict that the person is about to lose consciousness or experience some other form of medical distress. Likewise, the combination of position analyzer 306a labeling the video data as "chokehold" in combination with a trend downward from respiratory monitor 304b may lead the prediction model of alert generator 308 to predict that medical distress is likely to occur in the near future.

Based on its assessment of the outputs of audio analyzer 302, health analyzer 304, and video analyzer 306, alert generator 308 may issue an alert 314. In general, alert 314 may indicate the assessment made by alert generator 308 (e.g., the person is unconscious, the person is having a seizure, a prediction that the person is likely to exhibit medical distress, etc.). In various embodiments, alert 314 may be included with sensor data 312, or data derived therefrom, to a monitoring device, so as to alert a user to divert her attention to the current situation. In turn, the monitoring user may initiate measures, such as by providing voice commands to the wearable device of the first responder, requesting backup and/or the dispatch of emergency personnel to the location of the first responder (e.g., based on location data in sensor data 312), or the like.

In some embodiments, any or all of the above measures may also be initiated automatically via alert 314, depending on the severity determined by alert generator 308, whether the medical distress is currently occurring or predicted to occur, any confidence/likeliness scores associated with the determinations by alert generator 308, or the like. For instance, if alert generator 308 predicts that there is a likelihood of medical distress with a 20% confidence, alert 314 may simply notify a monitoring user to direct their attention to the situation. Conversely, if alert generator 308 predicts that the person interacting with the first responder is likely going into cardiac arrest, with a probability/confidence of 99% (or other selected threshold), it may issue alert 314 to automatically dispatch emergency medical personnel to the scene.

Figure 4:
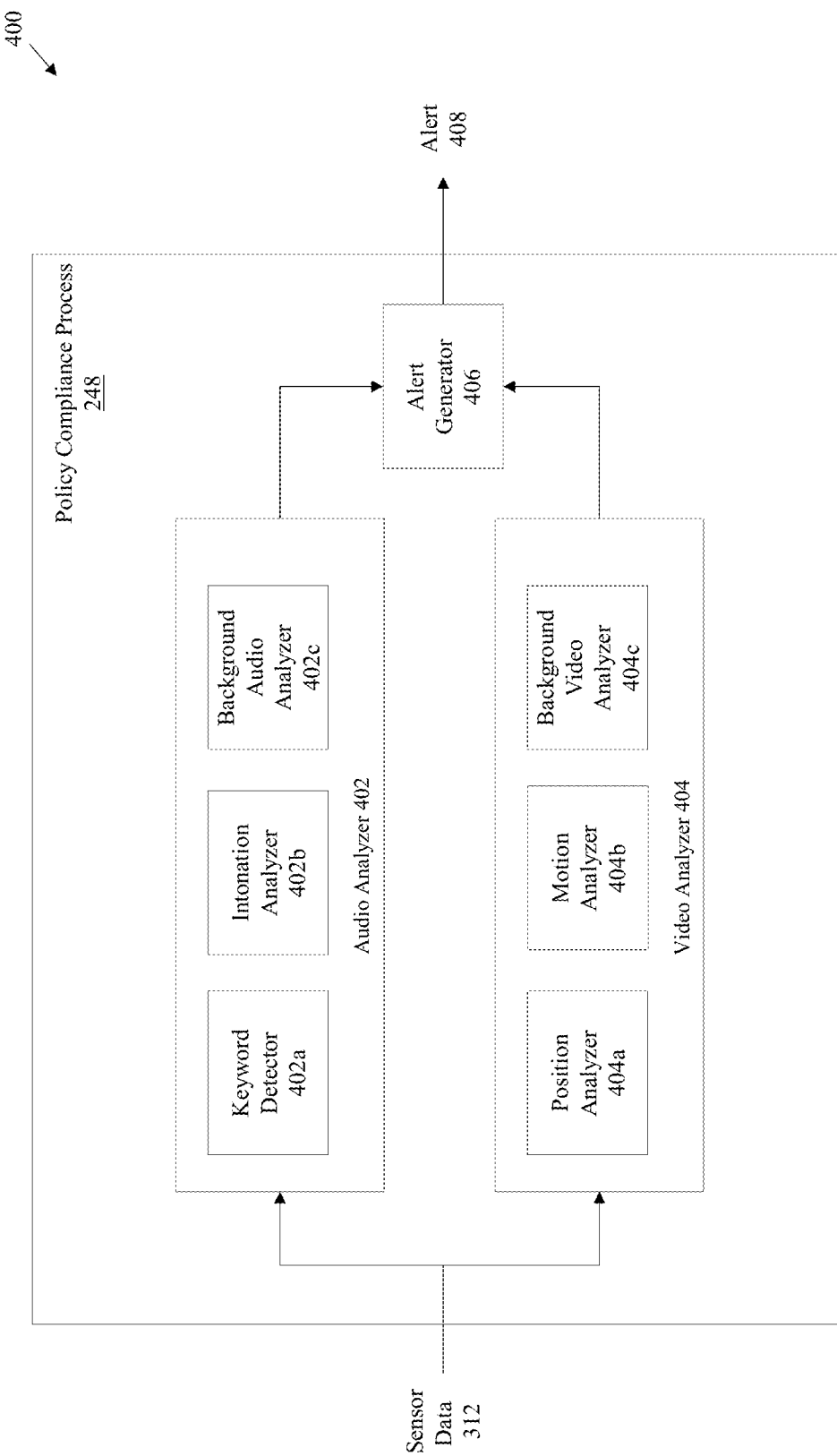
FIG. 4 illustrates an example architecture for a department policy compliance process, in accordance with various embodiments herein.

FIG. 4 illustrates an example architecture 400 for policy compliance process 248, according to various embodiments. Similar to distress detection process 247, policy compliance process 248 may be executed directly on the wearable device of a first responder, on a device in communication therewith (e.g., a device located in an emergency vehicle, a supervisory service, etc.), or in a distributed manner across such devices, in which case the combination of devices can themselves be viewed as an executing device. In further embodiments, the functionalities of processes 247-248 may be combined or omitted, as desired.

As shown, policy compliance process 248 may include an audio analyzer 402 configured to ensure that the first responder complies with any departmental policies, according to various embodiments. To this end, audio analyzer 402 may include a keyword detector 402a, an intonation analyzer 402b, and/or a background audio analyzer 402c. These sub-processes 402a-402c may be implemented in a similar manner to those of sub-processes 302a-302c, but with the focus on detecting departmental policy violations. Note that many departmental policy violations are written with safety in mind, so any violations could also be seen as helping to ensure the health of the person with whom the first responder is interacting.

By way of example, keyword detector 402a may monitor the audio in sensor data 312 for utterances by the first responder that are in violation of departmental policies. For instance, keyword detector 402a may identify the use of profanity, racial slurs, unsafe directions or commands, illegal conduct, or the like, by the first responder. In one embodiment, keyword detector 402a may also employ voice recognition, so as to ensure that only keywords uttered by first responder are evaluated for purposes of policy compliance.

Intonation analyzer 402b may evaluate the intonation of utterances by the first responder and/or the person with whom the first responder is interacting. For instance, if the first responder is yelling, this may indicate additional scrutiny of the situation by a monitoring user is needed. In further embodiments, yelling or other auditory features uttered by the person with whom the first responder is interacting, or any other people, may also be assessed.

Background audio analyzer 402c may extract, amplify, and/or evaluate any audio data in sensor data 312, to identify any utterances by bystanders that could be indicative of a department policy violation. For instance, background audio analyzer 402c may identify utterances by bystanders such as any or all of the following:

"You're [hurting] him!"
"[Get off] of him!"
"You're [choking] her!"
"This is [brutality] !"
Etc.

Video analyzer 404 may include any or all of the following: a position analyzer 404a, a motion analyzer 404b, and/or a background video analyzer 404c. These components may be implemented in a manner similar to position analyzer 306a, 306b, and background video analyzer 306c, but with the overall objective of detecting departmental policy violations.

In general, position analyzer 306a may comprise one or more video classifiers trained to identify any positions of the first responder within video data in sensor data 312 that may be considered a use of force. In various embodiments, position analyzer 406a may assess the video data to identify situations in which the first responder has employed a headlock, joint lock, chokehold, or the like, onto the person with whom the first responder is interacting. In some embodiments, such a classifier may be trained using a sample set of video data demonstrating the relative positions of a first responder and another person. In one embodiment, position analyzer 306a may construct a wireframe or other model of the first responder and/or the other person, prior to the classification. To this end, position analyzer 306a may comprise any number of image classifiers trained to identify specific body parts, such as elbows, necks, heads, legs, and the like, and/or their relative positions (e.g., skeletal tracking).

Position analyzer 306a may also include one or more machine learning classifiers trained to identify the deployment of a weapon by the first responder. For instance, position analyzer 306a may assess the video data in sensor data 312 to identify the deployment of a firearm, stun gun or other electrical weapon, chemical weapon (e.g., tear gas, pepper spray, etc.), baton or other blunt object, knife, or the like, by the first responder.

Motion analyzer 306*b* may assess the video data in sensor data 312 to identify any relative motions between the first responder and the person interacting with the first responder. For instance, motion analyzer 306*b* may detect any contact between the first responder and the person, such as punches, kicks, takedown throws, headbutts, and the like. In some instances, motion analyzer 306*b* may also assess any motion data available in sensor data 312, such as data captured by an accelerometer of the wearable device of the first responder. In yet another embodiment, motion analyzer 306*b* may be configured to identify when the first responder is in pursuit of another, such as when the first responder is chasing a suspect.

Background video analyzer 306*c* may assess the background video data in sensor data 312, to classify situations in which a crowd has gathered around the first responder, in various embodiments. Indeed, many instances of department policy violations draw crowds of bystanders. By analyzing the size, location, and variations of the crowd, background video analyzer 306*c* may identify situations that may be indicative of a policy violation or require additional scrutiny by a monitoring user. For instance, background video analyzer 306*c* may assess the video data in sensor data 312 to apply labels to it such as "normal," "small crowd," "medium crowd," "large crowd," "aggressive bystander(s)," etc.

Similar to distress detection process 247, policy compliance process 248 may also include an alert generator 406 configured to identify or predict the occurrence of a policy violation by the first responder and generate a corresponding alert 408. To do so, alert generator 406 may leverage an ensemble approach or other mechanism that takes into account the outputs of audio analyzer 402 and video analyzer 404, to determine whether an alert 408 should be sent. Such analysis may also apply various weightings to the outputs of audio analyzer 402 and video analyzer 404, as part of the decision process.

In some cases, alert generator 406 may issue an alert 408 to a monitoring device for purposes of drawing the attention of a monitoring user to the current situation involving the first responder. This may be done in cases of actual departmental policy violations, but also in cases in which alert generator 406 predicts that such a violation may occur in the future. For instance, one departmental policy may allow a first responder to deploy a chokehold in certain circumstances, but specify that a chokehold should not be used for more than n-number of seconds. In such a case, alert generator 406 may send alert 408 after detection of the chokehold, so that the monitoring user can review sensor data 312 in real time. Then, if the first responder continues to employ the chokehold, alert generator 406 may issue another alert 408 slightly before a violation occurs (e.g., at n-m seconds) or after an actual violation occurs.

In a further embodiment, alert generator 406 may send an alert 408 to the wearable device of the first responder, such as audio instructions for the first responder. For instance, alert 408 may notify the first responder that he or she has been applying a chokehold for m-number of seconds and to disengage. Such a notification can be particularly beneficial in times of stress in which the first responder may lose all sense of time or experience other sensory effects.

In addition to alert 408 alerting a monitoring user to the ongoing situation, or in lieu thereof, alert 408 may also initiate automatic corrective measures, depending on the assessment by alert generator 406, in various embodiments.

For instance, if alert generator 406 determines that a departmental policy is being violated, or may be violated in the immediate future, it may send an alert 408 requesting backup for the first responder, the deployment of a supervisor of the first responder, or the like. Doing so can help to ensure that an escalating situation gets deescalated quickly and provide additional personnel on the ground.

Figure 7:
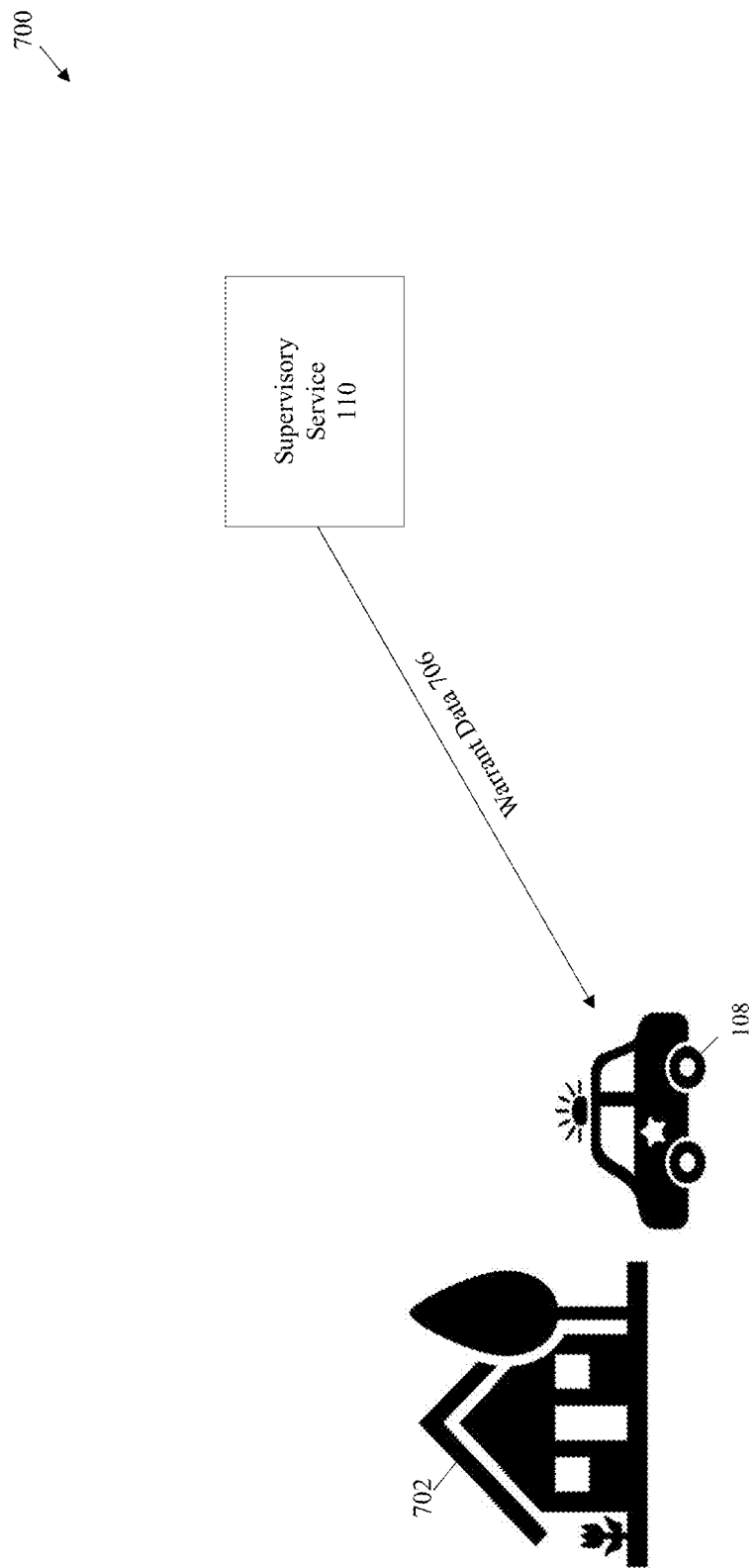
FIG. 7 illustrates an example of applying a departmental policy to the serving of a warrant, in accordance with various embodiments herein.

By way of another example, FIG. 7 illustrates an example 700 of applying a departmental policy to the serving of a warrant, in accordance with various embodiments herein. For instance, assume that vehicle 108 has been dispatched to serve an arrest warrant to an inhabitant of location 702. Accordingly, supervisory service 110 may send warrant data 706 to vehicle 108 and/or directly to wearable device 102 of the first responder 104 within warrant data 706. In general, warrant data warrant data 706 may be seen as a specific policy configuration for use by policy compliance process 248.

In various embodiments, warrant data 706 may include any or all of the following:

Location/address information—This information may indicate where the warrant is to be executed by first responder 104, allowing policy compliance process 248 to cross-verify the location of wearable device 102 versus the specified location/address information of warrant data 706. If, for instance, the first responder is at the wrong address, policy compliance process 248 may generate an alert, thereby warning the first responder of the error.

Image(s) of the arrestee—Another potential set of information included in warrant data 706 may be one or more images of the person to whom the arrest warrant applies. This can be used by policy compliance process 248 to perform facial recognition and cross-verification on the person being arrested, to ensure that there is a match. If not, policy compliance process 248 may likewise raise an alert that the person being arrested does not match the person associated with warrant data 706.

Audio samples of the arrestee—In some embodiments, warrant data 706 may further include one or more audio samples of the person associated with the warrant. This allows policy compliance process 248 to also perform voice recognition, to ensure that the person being arrested matches the person associated with warrant data 706.

In other words, policy compliance process 248 may operate to ensure that the warrant is executed in a satisfactory manner by applying certain policies to the captured sensor data, so as to avoid serving the warrant on the wrong address, arresting the wrong person, and the like.

Referring again to FIG. 4, in further embodiments, the functionalities of distress detection process 247 and policy compliance process 248 may also operate in conjunction with one another, such as by using some or all of the outputs or intermediate assessments made by the other process. For instance, if distress detection process 247 determines that the person with whom the first responder is exhibiting medical distress, this information can be used as input by policy compliance process 248 to further enhance its assessment of compliance with the departmental policies. For instance, deployment of a restraint by the first responder, coupled with medical distress exhibited by the person, may result in a different assessment by policy compliance process 248 than based on the deployment of the restraint alone.

By way of example, consider again the case shown in FIG. 6. In such a case, distress detection process 247 may analyze the behavior of person 602 to determine whether they are in medical or psychological distress, as a result of being restrained in the manner that they are. In turn, policy compliance process 248 may also assess the actions of first responder 604, to ensure that they are acting within departmental guidelines. For instance, if person 602 begins exhibiting signs of medical distress, distress detection process 247 may generate an alert to first responder 604, notifying them to the situation and potentially directing them to get off of person 602. In another example, assume that kneeing on a suspect is prohibited by departmental policy or is only allowed for x-number of seconds. In such a case, policy compliance process 248 may likewise generate an alert, thereby directing first responder 604 to immediately get off of person 602.

Figure 5:
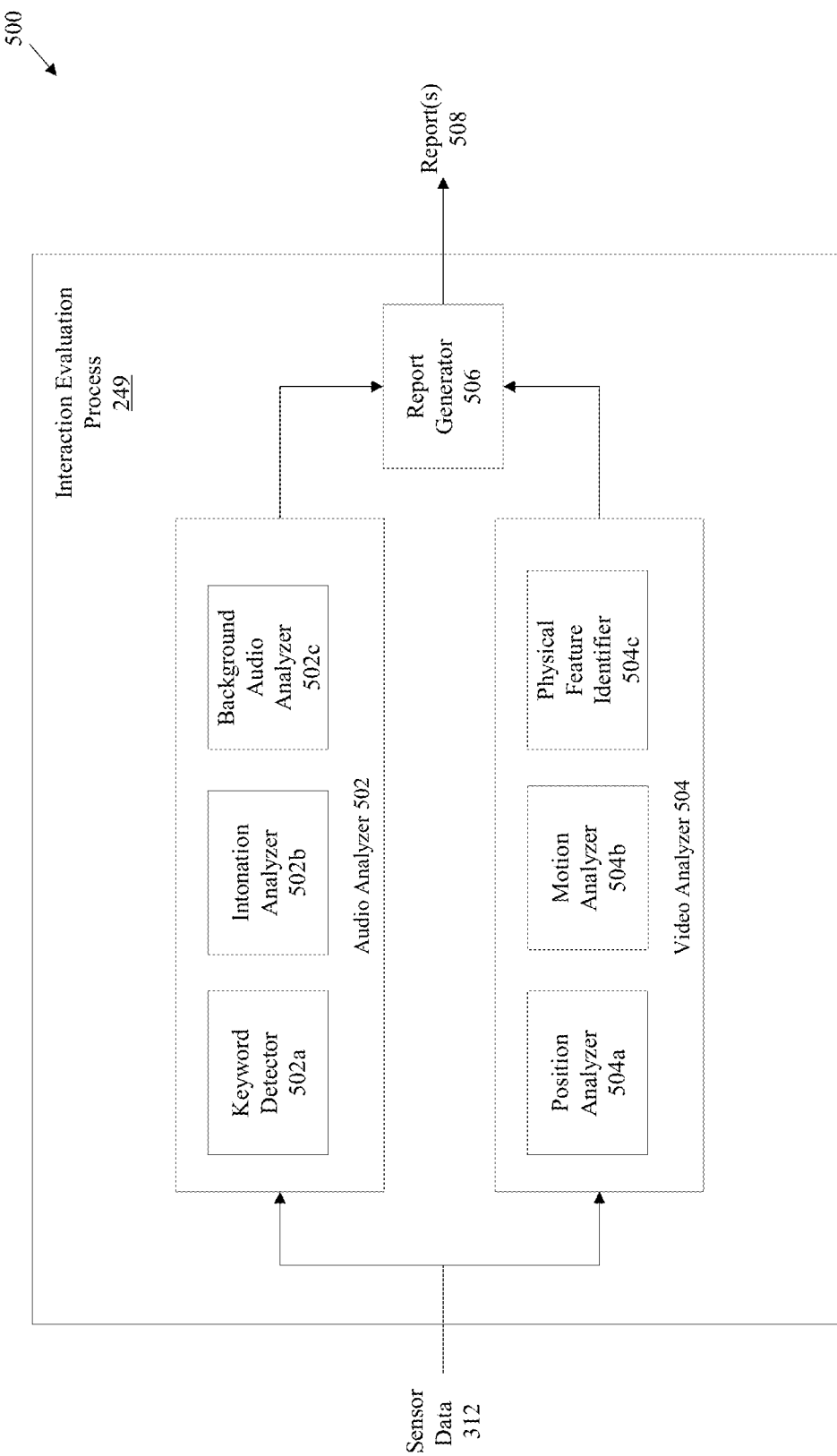
FIG. 5 illustrates an example architecture for an interaction evaluation process, in accordance with various embodiments herein.

FIG. 5 illustrates an example architecture 500 for interaction evaluation process 249, in accordance with various embodiments herein. In general, interaction evaluation process 249 is configured to apply machine learning and/or other data analysis approaches (e.g., statistical approaches, thresholding, etc.), to sensor data 312, to generate one or more report(s) 508 regarding the interactions between a particular first responder, or a plurality of first responders, with a member of the public. In contrast to policy compliance process 248, which may detect policy violations on the fly and generate corresponding alerts, interaction evaluation process 249 is primarily concerned with characterizing how the first responder and the person interact, such as whether the interaction is confrontational, friendly, etc.

In various embodiments, interaction evaluation process 249 may include an audio analyzer 502 that comprises any or all of the following: a keyword detector 502a, an intonation analyzer 502b, and/or a background audio analyzer 502c. In other words, each of these components may be constructed in a similar manner to the corresponding components of audio analyzers 302-402 (e.g., as one or more machine learning classifiers, etc.), but using a training dataset including examples of any or all of the following classification labels:

Aggressive behavior by first responder;
Aggressive behavior by the person interacting with the first responder;
Neutral behavior by first responder;
Neutral behavior by the person interacting with the first responder;
Friendly behavior by the first responder;
Friendly behavior by the person interacting with the first responder;
Etc.

To this end, keyword detector 502a may be trained to identify any of the following keywords or phrasal variations in the audio of sensor data 312:

"[Get] on the ground, now."
"[Put] your hands on your head."
"[Don't] try it!"
"Pig!"
"[Thank you] !"
"You [saved] me."
Other keywords indicative of the above classification labels.
Etc.

Intonation analyzer 502b may also comprise one or more machine learning-based classifiers trained to identify the intonations of the voices present in the audio of sensor data 312 and label them, accordingly, in various embodiments. For instance, if the first responder goes from a neutral tone to yelling, this may indicate that the interaction has gone from neutral to aggressive. As with intonation analyzers 302b, 402b, the output of intonation analyzer 502b may provide additional context that can aid in classifying the overall interaction between the first responder and another.

Background audio analyzer 502c may comprise any number of machine learning-based audio classifiers to assess the background audio of sensor data 312, to label the background audio with labels such as any or all of the following:

Panting
Yelling
Crowd posture (e.g., aggressive, neutral, helpful, etc.)
Etc.

Position analyzer 504a may comprise any number of machine learning-based video classifiers, similar in construction as that of position analyzers 306a, 404a, but with a focus on applying classification labels to the video data of sensor data 312 with respect to the interaction between the first responder and another. For instance, position analyzer 504a may be trained to apply any or all of the following labels to the video of sensor data 312:

Physical altercation between first responder and the person
Aggressive positioning by first responder (e.g., raised fists, drawn weapon, etc.)
Aggressive positioning by the person interacting with the first responder
Neutral positioning by first responder
Neutral behavior by the person interacting with the first responder
Friendly behavior by the first responder
Friendly behavior by the person interacting with the first responder
Etc.

Similarly, motion analyzer 504b may include one or more classifiers trained to label the video of sensor data 312 with any or all of the following:

Fleeing suspect
Physical attack on first responder (e.g., spitting, hitting, kicking, punching, etc.)
Physical attack by first responder (e.g., the first responder striking a person)
Movement towards first responder
Movement away from first responder
Neutral movements (e.g., keeping a normal distance, etc.)
Friendly behavior by the first responder (e.g., extending a handshake, etc.)
Friendly behavior by the person interacting with the first responder
Etc.

In various embodiments, video analyzer 504 may also include a physical feature identifier 504c that is trained to identify the gender, age, race and/or ethnicity of the person with whom the first responder is interacting. While not directly required to assess the overall interaction, physical feature identifier 504c may provide valuable metrics to help categorize how a particular first responder or group of first responders interact with people of different genders, ages, races or ethnicities. Accordingly, physical feature identifier 504c may include one or more classifiers trained using a training dataset of images that have been labeled with an appropriate classification label. For example, gender classification labels may be male, female, or unclassified, while age classification labels may be child, youth, adult, elderly, or more specific ranges, depending upon the capabilities of the system. In addition, physical feature identifier 504c may apply any of the following race classification labels, as used by the U.S. Census Bureau, to a depiction of the person with whom the first responder is interacting:
- White/Caucasian;
- Black/African-American;
- Native American or Alaskan Native;
- Asian; or
- Native Hawaiian or Other Pacific Islander.

In some embodiments, synthetic training data may also be generated and used to train the classifier of physical feature identifier 504c, so as to provide a sufficient set of data features. For instance, a generative adversarial network (GAN) may be used to generate variations of images that have been labeled as depicting a person of a particular race, so as to create a more robust training dataset for race/ethnicity identifier 504c.

Ethnicity detection may be achieved in a number of ways. In some instances, physical feature identifier 504c may be trained to identify specific visual indicia that may help to identify the ethnicity of the person with whom the first responder is interacting. For instance, if the person is wearing a particular flag or symbol, this may be indicative of their ethnicity. In a further embodiment, audio analyzer 502 may be configured to identify the presence of an accent or use of a particular language by the person and the techniques herein may use this information as input, to aid in its classification. For instance, if audio analyzer 502 indicates that the person is speaking Spanish, the techniques herein (e.g., physical feature identifier 504c and/or report generator 506) may classify the person as being of Hispanic ethnicity.

Report generator 506, in particular, is configured to take as input the labels/outputs of audio analyzer 502 and/or video analyzer 504, to generate report(s) 508 that may be sent to any number of electronic devices for review. In general, report generator 506 may summarize an interaction between a first responder and another person, using the outputs of audio analyzer 502 and/or video analyzer 504. For instance, in one embodiment, report generator 506 may include a decision tree, random forest, or other mechanism that labels the overall interaction between the first responder and the person as being "First Responder Aggressive," "Aggressive Person," "Mutual Aggression," "Neutral," "Friendly," or the like.

In various instances, a report 508 generated by report generator 506 may be on a particular interaction, for a particular first responder over a particular timeframe, or for an aggregate of interactions (e.g., for a particular timeframe, a particular set of first responders, department-wide, etc.). Such a report may also include any inferences made by report generator 506, as well as any or all of the outputs of audio analyzer 502 and/or video analyzer 504. In addition, in some embodiments, a report 508 may include statistics derived from this data. For instance, a report 508 may indicate the number or percentages of the different types of interactions, potentially broken down by race or ethnicity, gender, age, and so on. Such information may be useful for purposes of identifying the need for additional training among first responders, helping first responders address any complaints issued against them, and the like. It may also be used to commend certain first responders and/or departments for the compliance with policies and procedures.

Figure 8:
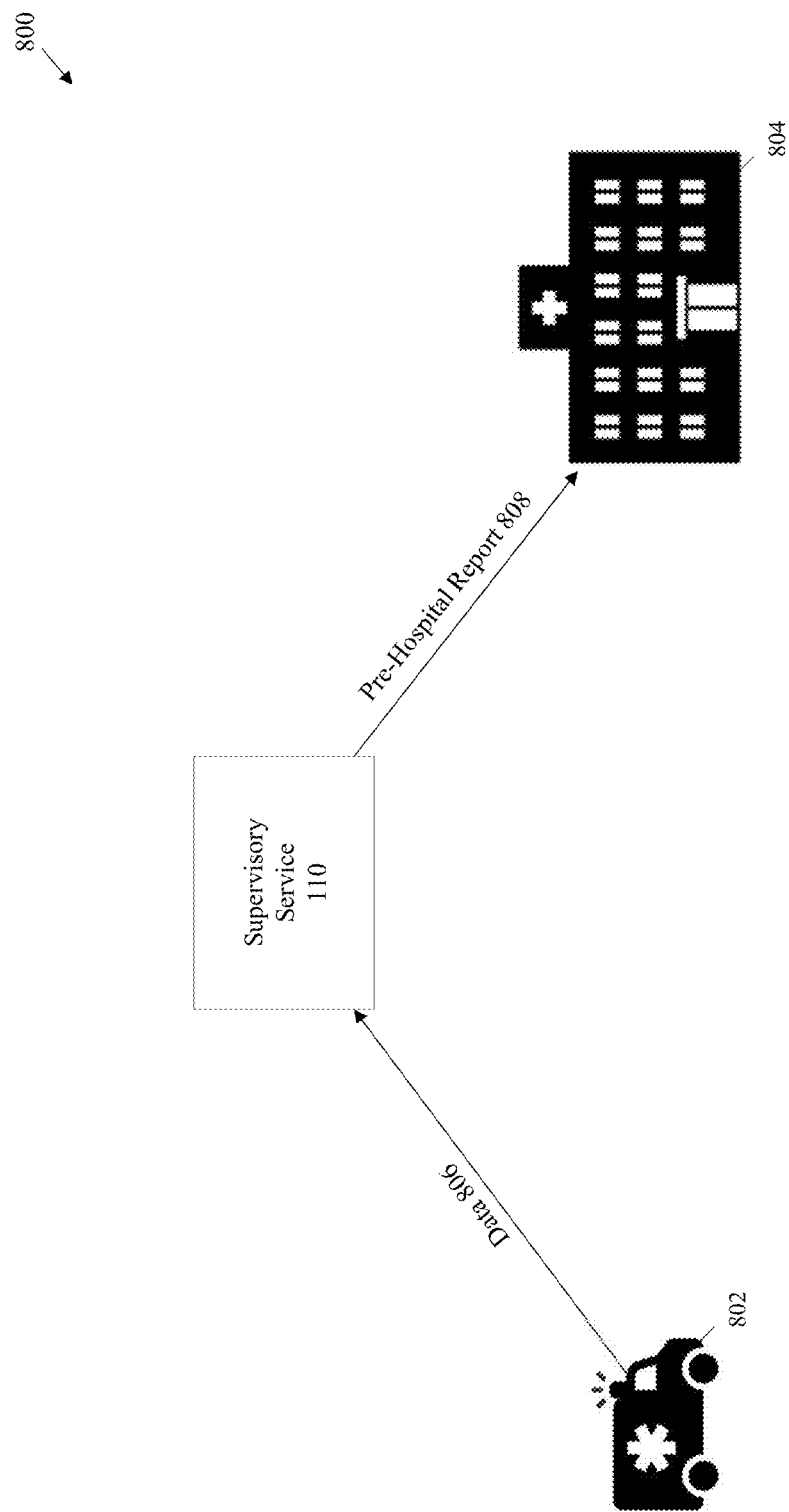
FIG. 8 illustrates an example of automatically providing a pre-hospital report, in accordance with various embodiments herein.

A further potential use case for interaction evaluation process 249 is shown in FIG. 8, according to various embodiments. In a medical situation, one or more first responders on board ambulance 802 may interact with a patient being transported to a hospital 804. For instance, emergency medical services (EMS) personnel in the United States are typically trained to ask questions regarding the following:
- Onset—e.g., "When did your symptoms first start?"
- Provocation—e.g., "Does anything make it better or worse?"
- Quality—e.g., "What does the pain feel like?"
- Radiates—e.g., "Does the pain go anywhere else?"
- Severity—e.g., "How does your pain rate on a scale of 0-10?"
- Time—e.g., "How long ago did your symptoms first start?"

The above information, often abbreviated as "OPQRST" information, help to quickly obtain details about the current state of the patient. In addition, EMS personnel are also typically trained to also obtain the following history information regarding the patient:
- Symptoms—e.g., "Can you tell me what's going on?"
- Allergies—e.g., "Do you have any allergies?"
- Medications—e.g., "Are you on any medications, either prescription, over the counter, or even street drugs?"
- Past medical history—e.g., "Do you have any medical conditions?"
- Last oral intake—e.g., "When was the last time you ate or drank something?"
- Events—e.g., "What were you doing when you started experiencing these symptoms?"

The above information, often abbreviated as "SAMPLE" information, helps to provide context to the state of the patient, and may be captured and analyzed by interaction evaluation process 249. For instance, if the patient is exhibiting signs of anaphylaxis, and has a history of being allergic to bee stings, this could be a strong indication that the person is having an allergic reaction.

In further embodiments, interaction evaluation process 249 may also capture and assess any indications of treatments that are administered to the patient. For instance, interaction evaluation process 249 may detect and recognize the administration of oxygen to the patient via nasal cannula, non-rebreather mask, or bag-valve mask. Other interactions that interaction evaluation process 249 may detect can include the administration of an intravenous or intraosseous line to the patient, insertion of a nasal- or oropharyngeal airway to the patient, administration of any medications to the patient, transport mechanisms involved in transporting the patient (e.g., via stretcher, via stair-chair, etc.), administration of any bandages or splints to the patient, etc.

As would be appreciated, interaction evaluation process 249 may also operate in conjunction with distress detection process 247 and/or policy compliance process 248. For instance, policy compliance process 248 may prompt the first responder to obtain the SAMPLE history of the patient during transport, if they had not already done so. In another instance, policy compliance process 248 may alert the first responder to any contraindications that are detected with respect to a treatment (e.g., if the patient indicates an allergy to aspirin and the first responder attempts to give them aspirin, etc.).

Likewise, distress detection process 247 may collect and report on any measurements taken during the interactions with the patient, such as their vital signs, any indications of trauma, changes in the condition of the patient, or the like.

According to various embodiments, data 806 may be provided to supervisory service 110, either as raw data, or as output alert data from distress detection process 247, policy compliance process 248, and/or interaction evaluation process 249, thereby allowing supervisory service 110 to generate a pre-hospital report 808 that is reported to 804. Such a report may indicate a brief summary of the collected and analyzed information, allowing the care of the patient on board ambulance 802 to be smoothly transitioned over to healthcare personnel at hospital 804. Indeed, pre-hospital report 808 may indicate learned information during the interactions such as the name of the patient, the birthdate of the patient, the estimated time of arrival of ambulance 802 at hospital 804, the chief complaint of the patient or nature of their illness, vital signs and/or trends in their vital signs, any relevant SAMPLE or OPQRST information, any treatments administered by the first responders or by the patient themselves, etc.

In further embodiments, supervisory service 110 may also generate a 'run report' based on data 806, or a template for such a run report, that summarizes the actions of the EMS personnel. Such a run report may include any or all of the information included in pre-hospital report 808, as well as additional information such as when ambulance 802 was dispatched, the address to which it was dispatched, when it arrived on scene, when it left for hospital 804, and when it arrived at hospital 804. In the templatized case, the template run report may automatically fill in the information acquired by the system, such as information about the patient, their vital signs, etc., allowing the EMS personnel to complete the run report by supplying any missing fields or a narrative of the call.

Figure 9:
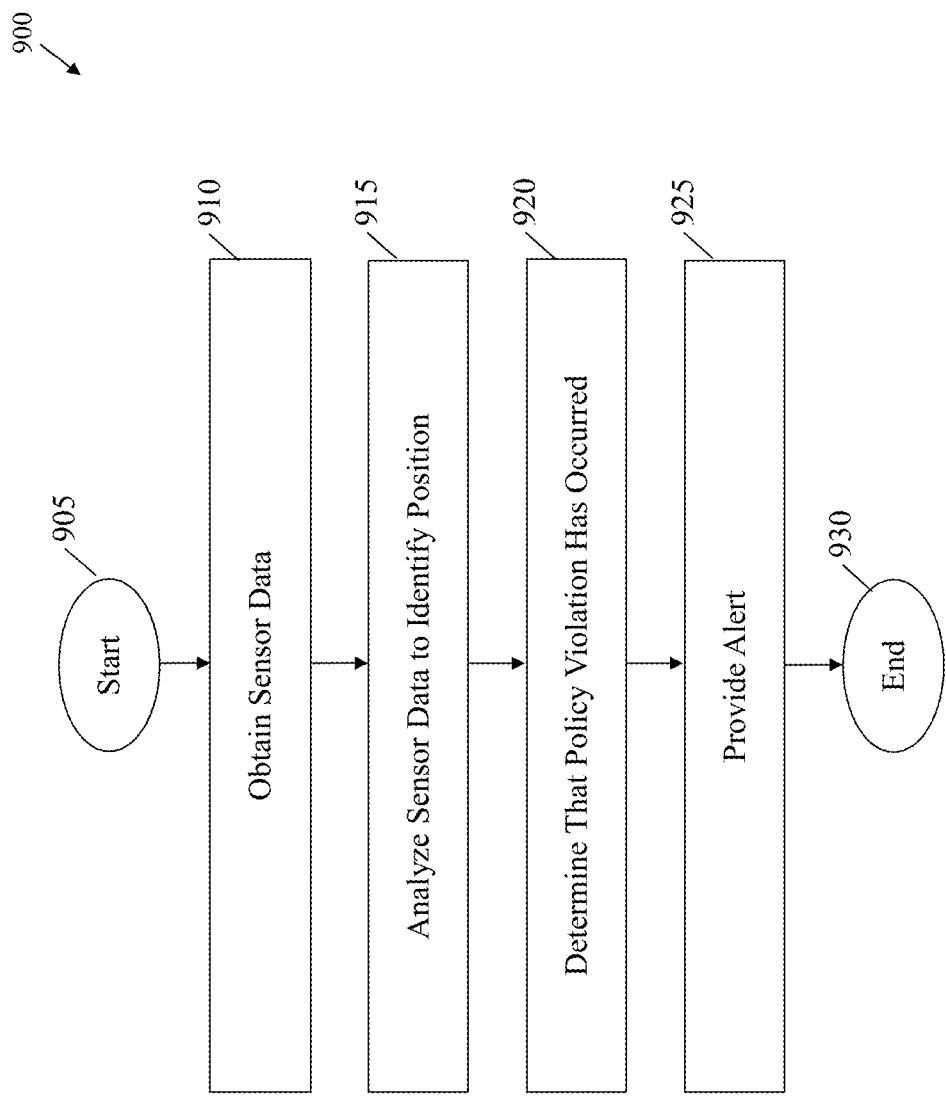
FIG. 9 illustrates an example simplified procedure for monitoring a first responder, in accordance with various embodiments herein.

FIG. 9 illustrates an example simplified procedure 900 (e.g., a method) for monitoring a first responder, in accordance with various embodiments herein. For example, a non-generic, specifically configured device (e.g., device 200), such as a wearable device, a device on board a vehicle of a first responder, or a remote device thereto, may perform procedure 900 by executing stored instructions (e.g., processes 247-249). The procedure 900 may start at step 905 and continue on to step 910 where, as described in greater detail above, the device may obtain sensor data from one or more sensors worn by a first responder. For instance, such sensor data may include location data, video or other image data, audio data, etc.

At step 915, as detailed above, the device may analyze the sensor data to identify a position of a person with whom the first responder is interacting. In various embodiments, the device may do so by applying a machine learning-based classifier to image or video data in the sensor data. For instance, the device may determine that the position of the person corresponds to a hold or restraint applied by the first responder to the person (e.g., a joint lock, a headlock, the first responder kneeling or laying on the person, etc.). In other instances, the position of the person may indicate that the person has been struck by the first responder (e.g., punched, kicked, hit with a blunt object, etc.).

At step 920, the device may determine that a policy violation has occurred, based in part on the position of the person, as described in greater detail above. In some instances, the position of the person alone may be enough to constitute a policy violation. In other instances, the device may further base its decision on an amount of time that has elapsed. For instance, the device may determine that a hold or restraint that is applied to the person for more than a threshold amount of time is a policy violation.

At step 925, as detailed above, the device may provide an alert indicative of the policy violation. Depending on the implementation of the device, this may entail the device providing an audible alert to the first responder, sending an alert to a supervisor of the first responder, causing an additional first responder to be dispatched, combinations thereof, or the like. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

As will be appreciated, the above examples are intended only for the understanding of certain aspects of the techniques herein and are not limiting in nature. While the techniques are described primarily with respect to a particular device or system, the disclosed processes may be executed by other devices according to further implementations. For example, while the techniques herein are described primarily with respect to identify and/or predicting medical distress or departmental policy violations, the techniques herein are not limited to use by first responders. For instance, the systems and methods introduced herein could also be employed by security personnel located at an airport, retail location, concert, sporting event, or the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, sensor data from one or more sensors worn by a first responder;
   analyzing, by the device, the sensor data to identify a position of a person with whom the first responder is interacting;
   determining, by the device, that a policy violation has occurred based in part on the position of the person where the position of the person corresponds to a hold or restraint applied by the first responder to the person; and
   providing, by the device, an alert that indicates the policy violation.

2. The method as in claim 1, wherein determining that the position of the person constitutes a policy violation comprises:
   determining that the hold or restraint has been applied by the first responder for more than a threshold amount of time.

3. The method as in claim 1, wherein the alert is an audible alert for the first responder.

4. The method as in claim 1, wherein the device provides the alert to a device of a supervisor of the first responder.

5. The method as in claim 1, further comprising:
   making, by the device and based on the sensor data, a determination that the person with whom the first responder is interacting is in medical distress, wherein the device determine that the position of the person constitutes a policy violation in part based on the determination that the person is in medical distress.

6. The method as in claim 5, wherein the sensor data is indicative of at least one of: a respiratory rate of the person or a pulse rate of the person.

7. The method as in claim 5, wherein the determination indicates that the person is unconscious.

8. The method as in claim 1, wherein determining that the position of the person constitutes a policy violation comprises:
detecting an utterance by a bystander in audio data of the sensor data, wherein the device determines that the position of the person constitutes a policy violation based in part on the utterance.

9. The method as in claim 1, wherein analyzing the sensor data to identify a position of a person with whom the first responder is interacting comprises:
applying a machine learning-based classifier to image or video data in the sensor data.

10. The method as in claim 1, wherein the alert causes an additional first responder to be dispatched to a location of the first responder.

11. The method as in claim 1, wherein the device obtains the sensor data from a vehicle of the first responder.

12. The method as in claim 1, wherein the device is worn by the first responder.

13. The method as in claim 1, wherein the position of the person indicates that the person has been struck by the first responder.

14. The method as in claim 1, further comprising:
detecting, by the device, a keyword uttered by the first responder, wherein the device determines that a policy violation has occurred based further in part on the keyword uttered by the first responder.

15. The method as in claim 14, wherein the keyword comprises an unsafe or illegal command for the person.

16. The method as in claim 1, further comprising:
detecting, by the device, a keyword uttered by the person, wherein the device determines that a policy violation has occurred based further in part on the keyword uttered by the person.

17. The method as in claim 1, further comprising:
generating, by the device, a report that summarizes an interaction between the first responder and the person.

18. An apparatus, comprising:
one or more network interfaces;
a processor coupled to the one or more network interfaces and configured to execute one or more processes; and
a memory configured to store a process that is executable by the processor, the process when executed configured to:
obtain sensor data from one or more sensors worn by a first responder;
analyze the sensor data to identify a position of a person with whom the first responder is interacting;
determine that a policy violation has occurred based in part on the position of the person where the position of the person corresponds to a hold or restraint applied by the first responder to the person; and
provide an alert that indicates the policy violation.

19. A tangible, non-transitory, computer-readable medium storing program instructions that cause a device to execute a process comprising:
obtaining, by the device, sensor data from one or more sensors worn by a first responder;
analyzing, by the device, the sensor data to identify a position of a person with whom the first responder is interacting;
determining, by the device, that a policy violation has occurred based in part on the position of the person where the position of the person corresponds to a hold or restraint applied by the first responder to the person; and
providing, by the device, an alert that indicates the policy violation.

* * * * *